455-4 XR 3,611,143

T5089 N
X5096 Y
X5094 N
X5119Y
X5120C
X5192T

[redacted]

[11] 3,611,143

[72] Inventor Petrus Josephus Van Gerwen
Emmasingel, Eindhoven, Netherlands

[21] Appl. No. 840,409
[22] Filed July 9, 1969
[45] Patented Oct. 5, 1971
[73] Assignee U.S. Philips Corporation
New York, N.Y.
[32] Priority July 9, 1968
[33] Netherlands
[31] 6,809,708

[54] DEVICE FOR THE TRANSMISSION OF RECTANGULAR SYNCHRONOUS INFORMATION PULSES
12 Claims, 39 Drawing Figs.

[52] U.S. Cl. 325/42, 178/68, 325/38, 325/65, 325/141
[51] Int. Cl. H03K 7/00, H04b 1/04
[50] Field of Search 325/38, 41, 30, 42, 141, 321, 323, 163, 65; 178/68; 328/167, 55

[56] References Cited

UNITED STATES PATENTS

| | | | |
|---|---|---|---|
| 3,378,771 | 4/1968 | Van Gerwen | 325/42 |
| 3,521,170 | 7/1970 | Leuthold | 325/323 |
| 3,522,537 | 8/1970 | Boughtwood | 325/49 |

*Primary Examiner*—Benedict V. Safourek
*Assistant Examiner*—Kenneth W. Weinstein
*Attorney*—Frank R. Trifari

ABSTRACT: A system for the transmission of rectangular synchronous information pulses from an information source to an information consumer within a prescribed frequency band in which the information pulse is in coincidence with different pulses from a series equidistant clock pulse generator, in which system use is made of a switching modulated device for the direct modulation of rectangular information pulses on to a rectangular carrier oscillator. A band-pass filter and a correction circuit follow the switching modulation device for the suppression of unwanted modulation products generated in the switching modulation device.

INVENTOR.
PETRUS J. VAN GERWEN
BY
AGENT

INVENTOR.
PETRUS J. VAN GERWEN
BY
AGENT

INVENTOR.
PETRUS J. VAN GERWEN
BY
AGENT

INVENTOR.
PETRUS J. VAN GERWEN
BY
AGENT

PATENTED OCT 5 1971 3,611,143

SHEET 05 OF 11

INVENTOR.
PETRUS J. VAN GERWEN
BY
[signature]
AGENT

INVENTOR.
PETRUS J. VAN GERWEN
BY
AGENT

INVENTOR.
PETRUS J. VAN GERWEN
BY
Frank R. Trifari
AGENT

INVENTOR.
PETRUS J. VAN GERWEN
BY
AGENT

INVENTOR.
PETRUS J. VAN GERWEN
BY
AGENT $X_{n+1}, Y_{n+1}$ $X_n, Y_n$

| A,B | 11 | 01 | 00 | 10 | Δφ |
|---|---|---|---|---|---|
| 00 | 11 | 01 | 00 | 10 | 0 |
| 01 | 01 | 00 | 10 | 11 | π/2 |
| 11 | 00 | 10 | 11 | 01 | π |
| 10 | 10 | 11 | 01 | 00 | 3π/2 |

INVENTOR.
PETRUS J. VAN GERWEN
BY
AGENT

INVENTOR.
PETRUS J. VAN GERWEN
BY
AGENT

DEVICE FOR THE TRANSMISSION OF RECTANGULAR SYNCHRONOUS INFORMATION PULSES

The invention relates to a device for the transmission of rectangular synchronous information pulses from an information source to an information user within a prescribed frequency band, the information pulses coinciding with different pulses from a series of equidistant clock pulses from a clock pulse generator, the device being provided with a switching modulating device fed by a carrier oscillator for direct modulation of the rectangular synchronous information pulses on a rectangular carrier oscillation, and furthermore an output filter whose passband corresponds to the prescribed frequency band, the clock frequency of the clock pulse generator and the carrier frequency of the carrier oscillator being derived from a single central generator.

In such transmission devices the total spectrum of the information pulses is usually not transmitted through the transmission path from information source to information user, but the transmitted spectrum is restricted with the aid of filter networks to a transmission band having a bandwidth which is required for the transmission of the spectrum of the information pulses up to approximately half the clock frequency. The overall transmission characteristic in conformity with a known Nyquist criterion is then often chosen to be such that when recovering the information pulses at the receiver end by sampling the detected signals in the rhythm of the clock frequency the distinction between the detected signals is as large as possible at the sampling instants.

Furthermore, the carrier frequency is in practice often chosen to be much higher than the clock frequency, for example, a factor of 5 to 10 higher so as to prevent as much as possible unwanted modulation products from occurring in the restricted transmission band which products — in spite of the above-mentioned choice of the overall transmission characteristic — become noticeable at the receiver end in a reduction of the distinction between the detected information pulses. According to the current opinion, compare Bennet and Davey "Data transmission" McGraw Hill 1965, page 134 etc. this occurrence of unwanted modulation products cannot be allowed because the influence thereof in the restricted transmission band can not be eliminated later.

To counter the influence of unwanted modulation products in a relatively wide transmission band which is located near zero frequency, the information pulses can directly be modulated on a high carrier frequency, so that substantially no unwanted modulation products occur in the frequency band required for transmission at the high carrier frequency. Subsequently this high transmission band can be separated by means of a high-pass filter and transposed in frequency to the low prescribed frequency band with the aid of a second modulation device. However, this method of modulation requires a second modulation device which in addition should be formed in analog techniques for a true transposition of the separated high transmission band.

A different method of modulation is usually used in practice at lower carrier frequencies, the spectrum of the information pulses already preceding the modulation in bandwidth being restricted to approximately half the clock frequency with the aid of a low-pass filter. However, also in that case the modulation device must be formed in analog techniques for the true transmission of the information pulses limited in their spectrum.

An object of the invention is to provide a different conception of a transmission device of the type described in the preamble, in which a switching modulation device which is entirely constructed in digital techniques can still be used while maintaining an optimum distinction between the information pulses detected at the receiver end at lower carrier frequencies, which transmission device is furthermore particularly suitable for an entire digital construction and hence for a construction as an integrated circuit.

The device according to the invention is characterized in that a correction circuit in the form of a linear network is incorporated after the switching modulating device in case of carrier frequencies which are equal to a small integer multiplied by half the clock frequency, said correction circuit correcting within the prescribed frequency band the spectrum occurring behind the switching modulating device and being deformed by the unwanted modulation products generated in the switching modulating device.

Not only do the steps according to the invention eliminate a prejudice now prevailing among those skilled in the art, but they also provide the surprising advantage that the unwanted phenomena brought about in a nonlinear switching modulating device are eliminated by a linear network.

The correction circuit may be constructed in analog techniques, but the transmission device according to the invention becomes particularly interesting when a digital filter of the kind described in prior Dutch Patent application 6514831 is used in the construction of the correction circuit, since this filter makes it possible to obtain the amplitude-frequency characteristic and phase-frequency characteristic desired for correction in a surprisingly simple manner and with great mutual freedom.

In order that the invention may be readily carried into effect, a few embodiments thereof will now be described in detail by way of example, with reference to the accompanying diagrammatic drawings, in which:

FIG. 1 shows a transmission device according to the invention adapted for phase modulation;

FIGS. 2*a–g* and FIGS. 5*a–d* show a few time diagrams, and FIGS. 3*a–d* and FIGS. 4*a–c* show a few frequency diagrams to explain the operation of the device of FIG. 1;

FIG. 7 and FIG. 9 show transmission devices according to the invention adapted for amplitude modulation, while

FIG. 11 shows a transmission device according to the invention adapted for frequency shift keying, while

Figure 13:
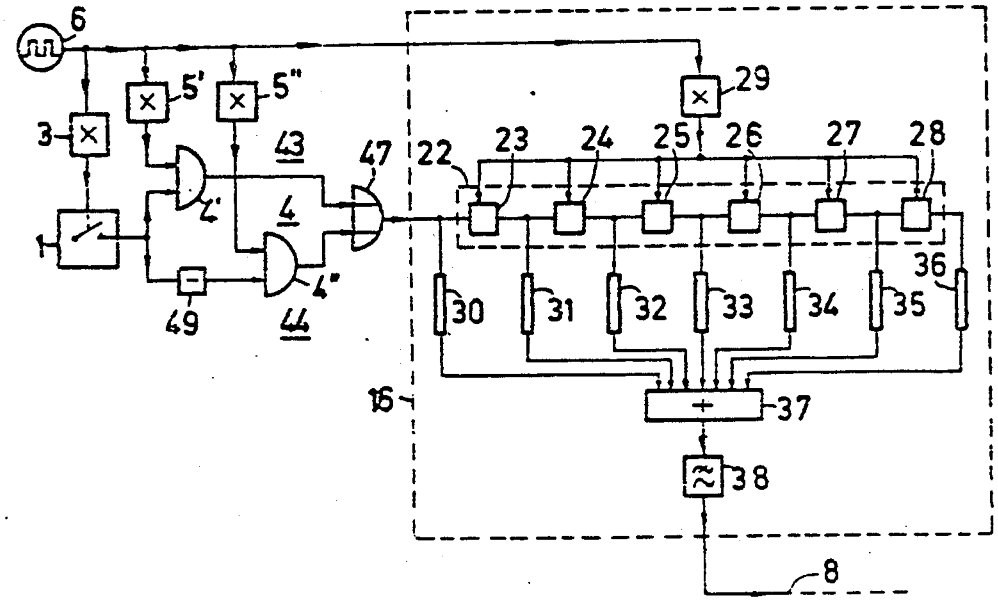
FIG. 13 shows a modification of the transmission device of FIG. 12.
Figure 15:
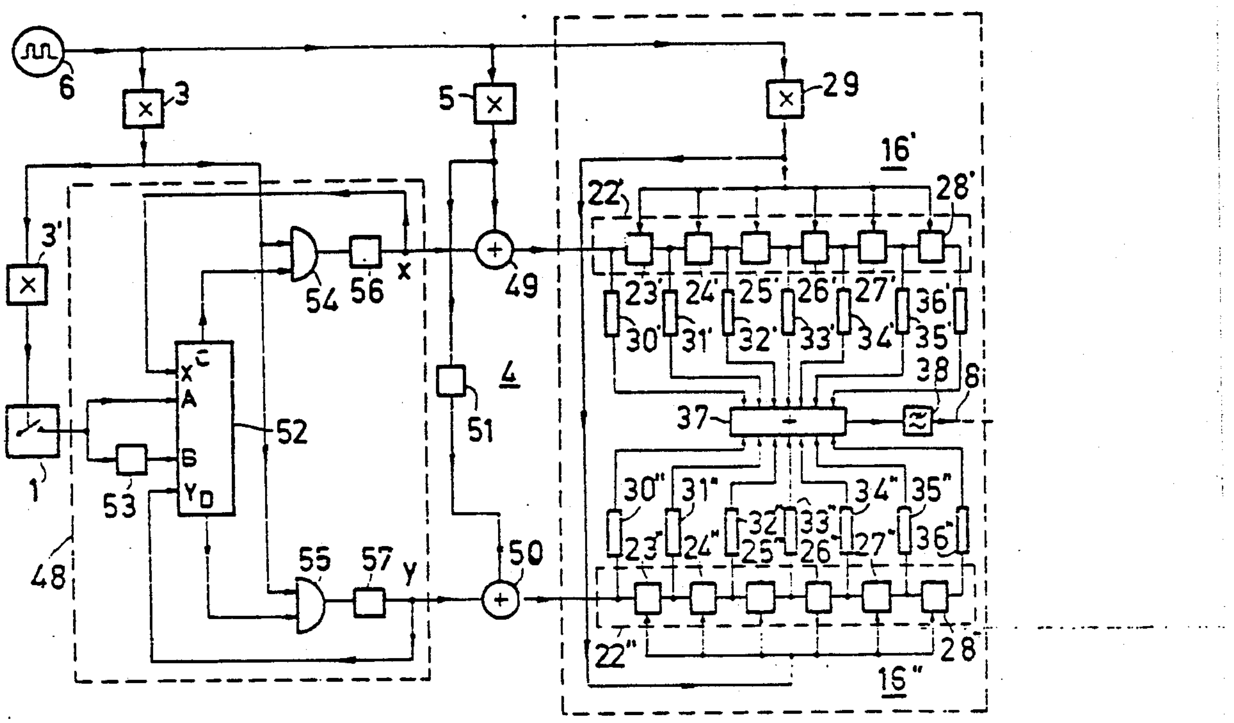
Figure 16:
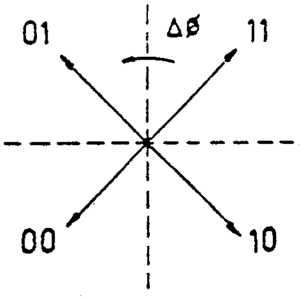
Figure 17A:
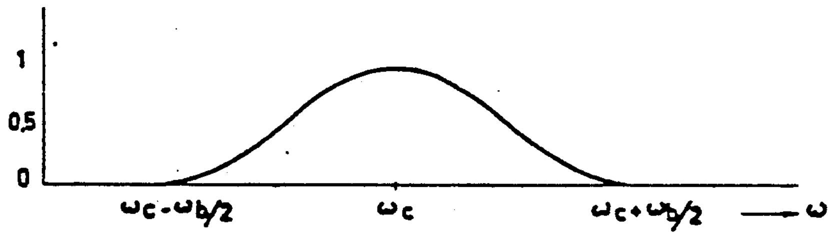
Figure 17B:
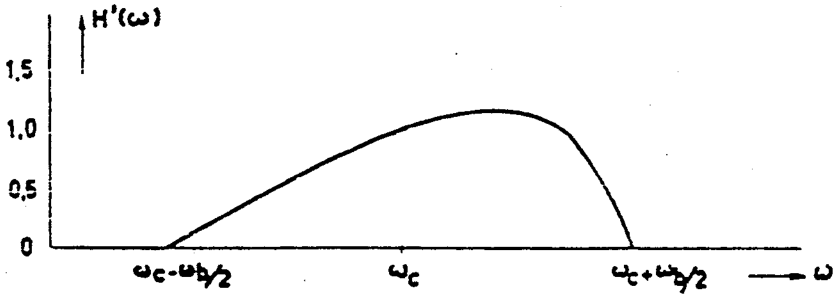
Figure 17C:
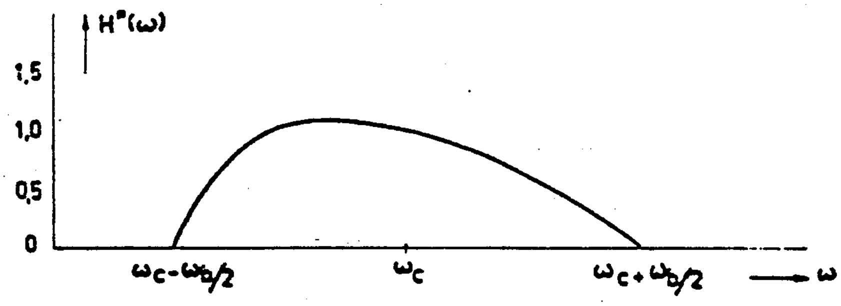

FIGS. 14*a–e* shows a few time diagrams to explain FIG. 13;

FIG. 15 shows a transmission device according to the invention adapted for differential four-phase modulation, while FIG. 16 shows a table and a vector diagram and FIGS. 17*a–c* shows a few frequency diagrams to explain FIG. 15.

Figure 1:
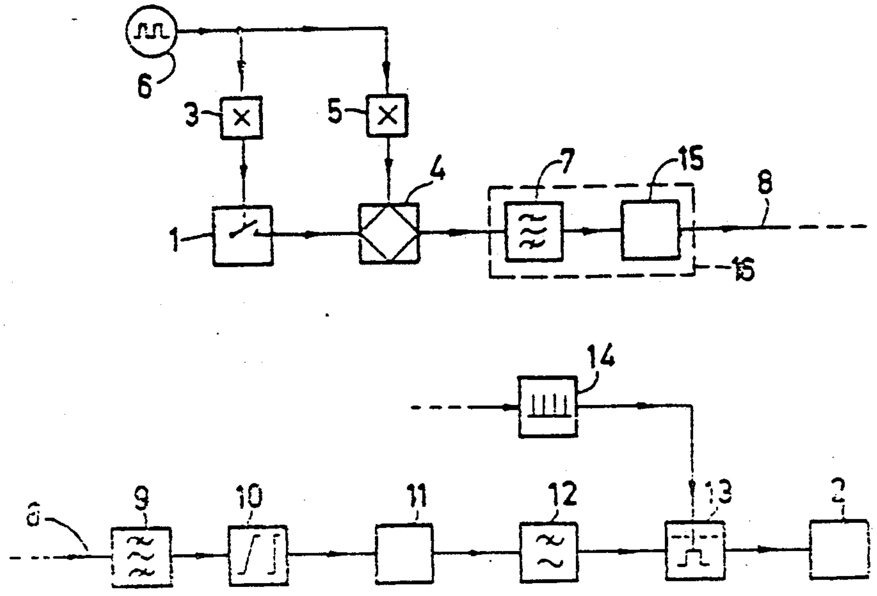

FIG. 1 shows a device for the transmission of bivalent synchronous information pulses from an information source 1 to an information user 2 within a prescribed frequency band of, for example, 300 – 3300 c./s. at a transmission speed of, for example, 1200 Baud. The bivalent information pulses from information source 1 coincide with different pulses from a series of equidistant clock pulses from a clock pulse generator 3 and are applied to a switching modulating device 4 functioning as a phase modulator so as to directly phase modulate therein a rectangular carrier oscillation originating from a carrier oscillator 5. In the embodiment shown the clock pulse generator 3 and the carrier oscillator 5 are both formed by an astable multivibrator which is synchronized by pulses from a central pulse generator 6. The repetition frequency $f_0$ of the central pulse generator 6 is, for example, 300 c./s., while the clock frequency $f_b$ of 1200 c./s. and the carrier frequency $f_c$ of, for example, 1800 c./s. are derived from the frequency $f_0$ by frequency multiplication by respective factors of 4 and 6 in the astable multivibrators 3 and 5 functioning as frequency multipliers. The phase-modulated carrier oscillation is passed on for further transmission to a transmission line 8 through an output filter 7 having a passband of, for example, 600 – 3,000 c./s. which is important for transmission.

The modulated signals received through transmission line 8 are applied at the receiver end through a receiving filter 9 having a passband of 600–3,000 c./s. and an equalizing network 10 for equalization of the amplitude and phase characteristics to a detection device 11, which is, constructed, for example, as a synchronous phase demodulator, in which the received signals are demodulated with the aid of a local carrier oscillation having a frequency $f_c$. A low-pass filter 12 having a cutoff frequency which is equal to approximately half the clock frequency $f_b/2$ is connected to the output of the detection device 11 for separation of the detected signals from which the original information pulses are recovered by sampling and pulse regeneration in a pulse regenerator 13 which is controlled by a series of pulses of clock frequency $f_b$ originating from a local clock pulse generator 14. The regenerated information pulses are passed on for further handling to the information user 2. In the embodiment shown the local clock pulse generator 14 is synchronized in known manner not further described herein with the clock frequency $f_b$ generated at the transmitter end, for example, by means of a pilot signal cotransmitted with the modulated signals or by means of a synchronizing signal derived from the modulated signals themselves.

The overall transmission characteristic of the device of FIG. 1 including the filter networks 7, 9, 10, 12 at the transmitter and received ends and the transmission line 8 is adjusted in accordance with the known Nyquist criterion for maintaining equidistant zeros in the impulse response, the filter networks at the received end giving an optimum noise suppression. Thus it is achieved that the distinction between the detected signals at the output of the low-pass filter 12 is as great as possible at the sampling instants.

FIG. 2 shows a few time diagram for further explanation of the operation of the device of FIG. 1.

A series of bivalent information pulses to be transmitted having a normal pulse width which is equal to the period T of the clock frequency $f_b$ is shown at *a* in FIG. 2, and a series of rectangular carrier pulses having a width of $D=1/(2f_c)$ is shown at *b* which series is phase-modulated by the series of information pulses *a*. The phase-modulated rectangular carrier oscillation which shows a phase step $\pi$ at transitions in the series of information pulses *a* is shown at *c* in FIG. 2, while *d* shows the phase-modulated carrier oscillation after filtering in the output filter 7.

After synchronous detection in the detection device 11 and after filtering in the low-pass filter 12, the detected signals shown at *e* in FIG. 2 arise at the receiver end from which signals the original information pulses are recovered by sampling with a series of sampling pulses *f* of clock frequency $f_b$ and by pulse regeneration as is shown at *g* in FIG. 2 (compare *a*).

Despite the fact that the overall transmission characteristic of the device of FIG. 1 satisfied the aforementioned Nyquist criterion, at the carrier frequency $f_c=3f_b/2$ which is low relative to the clock frequency $f_b$ it appears that the distinction between the detected signals is not optimum at the sampling instants which is to be ascribed to the fact that at this proportionally low carrier frequency unwanted modulation products of considerable strength fall within the passband of the output filter 7 at the transmitter end as a result of the non linear modulation process in the switching modulating device 4, as will now further be described with reference to a few frequency diagrams in FIG. 3.

FIG. 3 shows at *a* the envelope of the spectrum $S(f)$ of a random series of information pulses having a nominal pulse width of $T=1/f_b$ originating from information source 1, which envelope, as is known, has zeros at an integer multiplied by the clock frequency $f_b$. FIG. 3 shows at *b* the envelope of the spectrum which is formed upon modulation of the fundamental frequency $f_c=3f_b/2$ of the rectangular carrier pulse from carrier oscillator 5 with the aforementioned random series of information pulses, the desired modulated signals indicated by a solid line occurring on the one hand within the passband from $f_c-f_b$ to $f_c+f_b$ of output filter 7 which passband is important for transmission, but on the other hand also unwanted modulation products occur of the type $f-f_c$ which are produced by modulation of this fundamental frequency $f_c$ with spectrum components *f* of the information pulses within the band from $2f_b$ to $4f_b$, indicated by a broken line. In addition to the fundamental frequency $f_c$ the third harmonic $3f_c$ of the fundamental frequency in the square carrier pulses are contributes to the unwanted modulation products within the passband of output filter 7 and particularly this third harmonic produces unwanted modulation products of the type $3f_c-f$ and $f-3f_c$, respectively, whose envelope in the spectrum at *c* in FIG. 3 are indicated by a solid and a broken line, respectively, and which are produced by modulation of the third harmonic $3f_c$ with the spectrum components *f* of the information pulses within the band from $2f_b$ to $4f_b$ and $5f_b$ to $7f_b$, respectively. Likewise, each odd harmonic of the fundamental frequency in the rectangular carrier pulses will provide two contributions to the unwanted modulation products so that in addition to the desired modulated signals an interference signal occurs within the passband of the output filter 7 which interference signal is given by the algebraic sum of a large number of unwanted modulation products and which influences in a disturbing manner at the receiver end the distinction between the detected signals at the sampling instants. The envelope of the spectrum occurring out of the switching modulating device is shown at *d* in FIG. 3. FIG. 3 also shows that the interference signal becomes smaller as the ratio between carrier frequency $f_c$ and clock frequency $f_b$ is chosen to be larger.

When using the above-mentioned switching modulating device 4, which enables a complete digital structure and hence a construction as an integrated circuit, an optimum distinction between the detected signals at the sampling instants is obtained according to the invention because a correction circuit 15 in the form of a linear network is incorporated out of the switching modulating device 4 at carrier frequencies $f_c$ equal to a small integer multiplied by half the clock frequency $f_b/2$, said linear network correcting the spectrum occurring behind the switching modulating device 4 and being deformed by the unwanted modulation products generated in the switching modulating device 4 within the prescribed frequency band.

The applicant has found from extensive investigations that wholly unlike a random interference signal there is a particularly close relationship between the spectrum components of the desired modulated signals and the spectrum components of the algebraic sum of all unwanted modulation products at a carrier frequency $f_c$ which is equal to an integer multiplied by half the clock frequency $f_b/2$. In fact, each spectrum component of the sum of all unwanted modulation products always coincides on the one hand as regards its frequency with a spectrum component of the desired modulated signals, or in other words the occurrence of the unwanted modulation products does not cause new frequency components to occur within the passband of the output filter 7, while on the other hand a relationship is present between the spectrum components as regards amplitude and phase such that not a single component of the desired modulated signals is extinguished by a component of equal frequency of the sum of all unwanted modulation products, or in other words no frequency components are lost due to the occurrence of the unwanted modulation products. Furthermore it is found that the set of spectrum components does not undergo any variation as regards the frequencies, but is also of such a nature as regards the amplitude and phase relationships between the desired and unwanted contributions that an optimum distinction between the demodulated signals at the sampling instants can be achieved with a simple correction circuit 15 in the form of the linear network.

Thus, for example, in the embodiment shown in FIG. 1, having a carrier frequency $f_c=3f_b/2$ the transfer function $C(\omega)$ of the correction circuit 15 is a real function of the radial frequency $\omega=2\pi f$ in accordance with the formula to be derived hereinafter:

$$C(\omega) = (-1) \cdot \frac{\omega/\omega_r}{1-\omega/\omega_r} \cdot \text{cotg}\, n^2 (\pi\omega/2\omega_r) \qquad (1)$$

cotg = cotangent
$\pi$ = ratio of circumference of a circle to the diameter

Figure 4A:
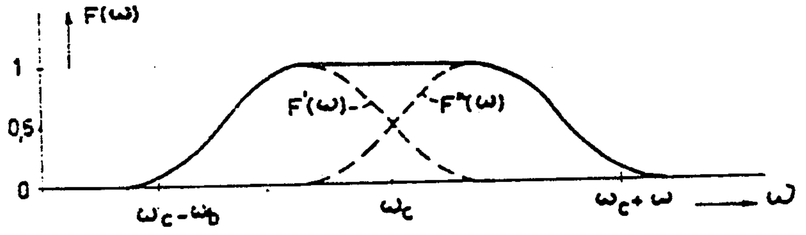
Figure 4B:
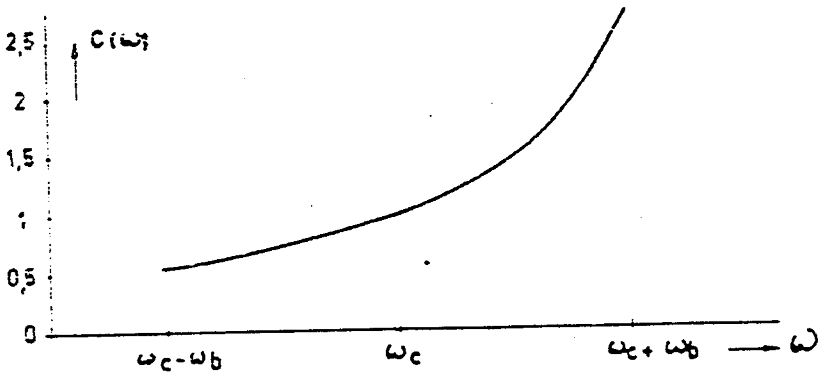
Figure 4C:
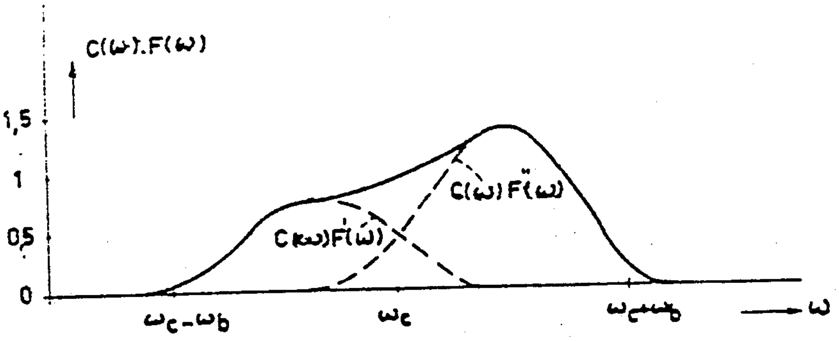

For illustration FIG. 4 shows at *a* an example of the transfer function F($\omega$) of the output filter 7 formed as a double sideband filter, while the FIG. shows at *b* the transfer function C ($\omega$) of the correction circuit 15 apart from the factor (−1) at a normalized scale, that is to say, at C ($\omega_c$)=1 as regards the part located within the passband ($\omega_c$-$\omega_b$,$\omega_c$+$\omega_b$) of output filter 7. The transfer function C ($\omega$). F($\omega$) of the series arrangement of output filter 7 and correction circuit 15 then has the shape shown at *c* in FIG. 4. The use of this correction function C($\omega$) then results in an ideal eye pattern of the detected signals having very sharp contours, in which only two clearly discrete values can be distinguished at the sampling instants.

It has been found from further investigations that the variation of the transfer function C($\omega$) required for correction is entirely independent of the bandwidth and the shape of the transfer function F($\omega$) of the output filter 7 and is the same for, for example, an output filter 7 of the vestigial sideband type or the single sideband type as that for the double sideband type. It has even been found that the correction in case of vestigial sideband filters and single sideband filters has a considerably greater effect, since in these cases the unwanted modulation products exert a disturbing influence to a still greater extent on the distinction between the detected signals at the sampling instants than in the case of double sideband filters. FIG. 4 shows at *a* by way of broken lines the transfer functions F' ($\omega$) and F'' ($\omega$) as examples which are associated with an output filter 7 for transferring with vestigial sideband the lower and upper sidebands of the modulated signals, while the corresponding transfer functions C ($\omega$). F' ($\omega$) and C($\omega$) F''($\omega$) are shown at *c* for the series arrangement of output filter 7 and correction circuit 15 likewise by way of broken lines.

Figures 5A, 5B:
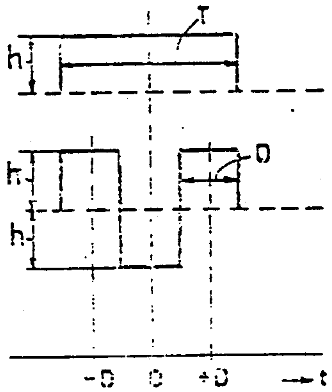
Figures 5C, 5D:
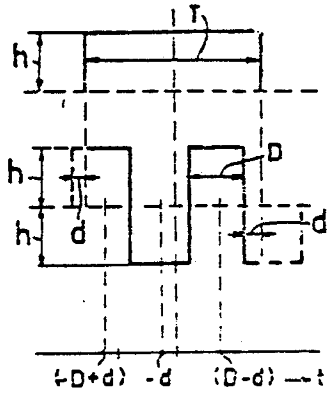
Figure 8A:
FIGS. 8*a–d* and FIGS. 10*a–d* show a few time diagrams and a frequency diagram to explain the transmission devices of FIG. 7 and FIG. 9, respectively.
Figure 8B:
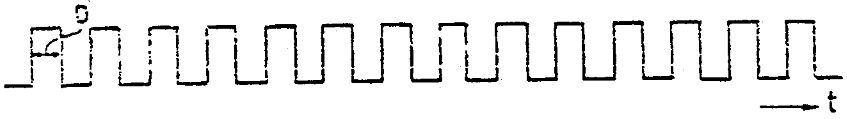
Figure 8C:
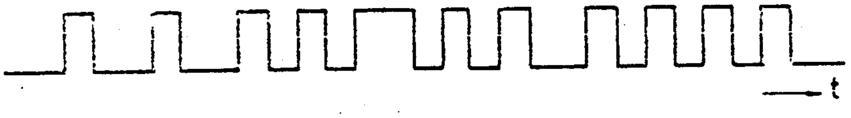
Figure 8D:
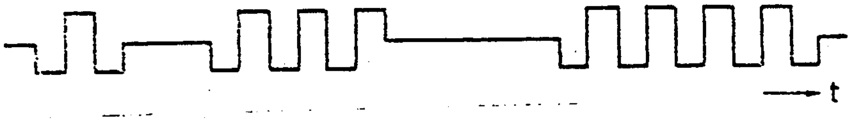

With reference to FIG. 5 a derivation of the correction function C($\omega$) will now be given for the above-mentioned embodiment having a carrier frequency $f_c=3f_b/2$. FIG. 5 shows at *a* a single information pulse from information source 1 which occurs at the instant $t=0$ and which has a width $T=1/f_b$ and a height $h$ of which information pulse the spectrum $S(\omega)$ is given by:

$$S(\omega)=2h\frac{\sin(\omega T/2)}{\omega} \quad (2)$$

sin = sine which formula as is known also represents the envelope of the spectrum of a random series of information pulses having a width $T$ (compare *a* in FIG. 3).

FIG 5 shows at *b* a portion of the modulated carrier oscillation corresponding to the information pulse at *a* at the output of switching modulating device 4, which portion is formed by a series of carrier pulses having a width of $D=1/(2f_c)$ and a height $h$ namely by carrier pulses of positive polarity at the instants $t=-D$, $t=+D$ and a carrier pulse of negative polarity at the instant $t=0$. The spectrum $P(\omega)$ of such a carrier pulse which occurs at an instant $t=0$ is given by:

$$P(\omega)=2h.\frac{\sin(\omega D/2)}{\omega} \quad (3)$$

while the spectrum of a similar pulse which occurs at any different instant $t=t_1$ is given by:

$$e^{-j\omega t_1}\cdot P(\omega) \quad (4)$$

$e$ = natural base
$j=\sqrt{-1}$

For the modulated pulse series shown at *b* the spectrum $M(\omega)$ is then given by:

$$M(\omega)=(e^{j\omega D}-1+e^{-j\omega D})\cdot P(\omega) \quad (5)$$

which after some reduction can be written as:

$$M(\omega)=\frac{\cos(3\omega D/2)}{\cos(\omega D/2)}\cdot P(\omega)$$

cos = cosine or with the aid of (3) as:

$$M(\omega)=2h\cdot\cos(3\omega D/2)\cdot\frac{\mathrm{tg}(\omega D/2)}{\omega} \quad (6)$$

tg = tangent

This formula also represents the envelope of the spectrum of the modulated signals which occurs upon modulation of the rectangular carrier oscillation with the aforementioned random series of information pulses.

The desired modulated signals at the output of the switching modulating device 4 have a spectrum which is symmetrical relative to the carrier frequency $\omega_c$ at least in the band from $\omega_c-\omega_b$ to $\omega_c+\omega_b$ which is important for transmission, the envelope $G(\omega)$ of said spectrum being formed by frequency transposition of the spectrum $S(\omega)$ given in (2) and the reflected spectrum $S(-\omega)$ thereof to the carrier frequency $\omega_c$ or in a formula:

$$G(\omega)=2h\cdot\frac{\sin[(\omega-\omega_c)T/2]}{(\omega-\omega_c)} \quad (7)$$

In this case wherein $\omega_c=3\,\omega_b/2$ hence $T=3D$, formula (7) can be written as $$G(\omega)=2h\cdot\frac{\cos(3\omega D/2)}{(\omega-\omega_c)} \quad (8)$$

The transfer function $C(\omega)$ required for correction then follows from the quotient of $G(\omega)$ and $M(\omega)$ which can be written with the aid of (8) and (6) as:

$$C(\omega)=G(\omega)/M(\omega)=(-1)\cdot\frac{\omega/\omega_c}{1-\omega/\omega_c}\cdot\mathrm{cotg}(\pi\omega/2\omega_c) \quad (9)$$

in conformity with (1).

The foregoing considerations can be extended without any difficulty to those cases where the carrier frequency $\omega_c=k(\omega_b/2)$ wherein $k$ represents an integer number which in practice mostly does not exceed 10.

Thus, for example, if $k$ is an odd number the following relation is found for the correction function $C(\omega)$:

$$C(\omega)=(-1)^{(k-1)/2}\cdot\frac{\omega/\omega_c}{1-\omega/\omega_c}\cdot\mathrm{cotg}(\pi\omega/2\omega_c) \quad (10)$$

$k=1,3,5,\ldots$ while if $k$ is an even number there applies:

$$C(\omega)=j(-1)^{k/2}\cdot\frac{\omega/\omega_c}{1-\omega/\omega_c}\cdot\mathrm{cotg}(\pi\omega/2\omega_c) \quad (11)$$

$k=2,4,6,\ldots$

As is found from (10) and (11) the correction function $C(\omega)$ for odd $k$ is a purely real function and for even $k$ is a purely imaginary function in which $C(\omega)$ surprisingly shows the same variation as a function of $\omega$ in all cases apart from the factors −1 and $\pm j$ which represent a constant phase shift $\pi$ and $\pm\mu/2$ of the entire spectrum, said variation being shown at *b* in FIG. 4. Both relations (10) and (11) can be combined as follows:

$$C(\omega)=(-j)^{k-1}\cdot\frac{\omega/\omega_c}{1-\omega/\omega_c}\cdot\mathrm{cotg}(\pi\omega/2\omega_c) \quad (12)$$

$k=1,2,3,\ldots$

It has always been assumed in the foregoing that a fixed phase relationship exists between the information pulses and the carrier pulses such that the leading and lagging edges of the information pulses coincide with leading and lagging edges respectively of the carrier pulses.

For the purpose of correction it is not strictly necessary that exactly this phase relationship exists but the correction function generally acquires a more intricate structure when this phase relationship is absent. If, for example, there is a time interval having a length $d$ as illustrated at $c$ and $d$ in FIG. 5 between the instants of occurrence of the corresponding leading and lagging edges of the information pulses and those of the carrier pulses, or in other words if the carrier pulses have undergone a phase shaft $\theta = \omega_c d$ then the correction function is given by:

$$C_\theta(\omega) = \frac{j \sin(\pi\omega/2\omega_r)}{[\cos(\pi\omega/2\omega_r) - \cos((\pi-2\theta)\omega/2\omega_r)] + j\sin((\pi-2\theta)\omega 2/\omega_r)} \cdot C(\omega) \quad (13)$$

wherein $C(\omega)$ is given in (12). It is found from (13) that the correction function $C_\theta(\omega)$ is now a complex function of $\omega$ and has considerably more intricate structure than $C(\omega)$ in accordance with (12). The full synchronization of information pulses and carrier pulses for which a correction function $C(\omega)$ according to (12) applies, is therefore preferred in practice.

In the above-given derivations the correction function $C(\omega)$ is always calculated for a correction circuit 15 in the form of a linear network incorporated immediately after the switching modulating device 4, while in the embodiment of FIG. 1 the correction circuit 15 is incorporated behind the output filter 7 which is also a linear network having a transfer function ($F\omega$). As is known an interchange of the sequence of the networks in a cascade arrangement of linear networks exerts no influence on the transfer function of the cascade arrangement so that the above-derived correction functions $C(\omega)$ also apply to the correction circuit 15 of FIG. 1 in which, however, now only the portion of the transfer function $C(\omega)$ located within the passband of the output filter 7 must be obtained (compare $b$ in FIG. 4). Alternately, the output filter 7 and the correction circuit 15 may be combined to form one linear network 16 in which filtering and correction are achieved simultaneously and the transfer function $H(\omega)$ of which is given by $H(\omega) = C(\omega).F(\omega)$ (compare $c$ in FIG. 4).

The desired transfer functions $C(\omega)$, $F(\omega)$ or $C(\omega)$. $F(\omega)$ can be achieved with networks composed of coils, capacitors and resistors, but the transmission device according to the invention acquires a particularly attractive structure when a digital filter of the kind described in prior Dutch Patent Application 6514831 is used for the construction of the network 16 composed of output filter 7 and correction circuit 15. Not only can the desired amplitude frequency characteristic and phase frequency characteristic be obtained in a surprisingly simple manner with great mutual freedom with such a digital filter, but such a filter also makes it possible to obtain a completely digital structure, and hence a construction as an integrated circuit of the transmission device of FIG. 1 as will now be described with reference to FIG. 6.

Figure 6:
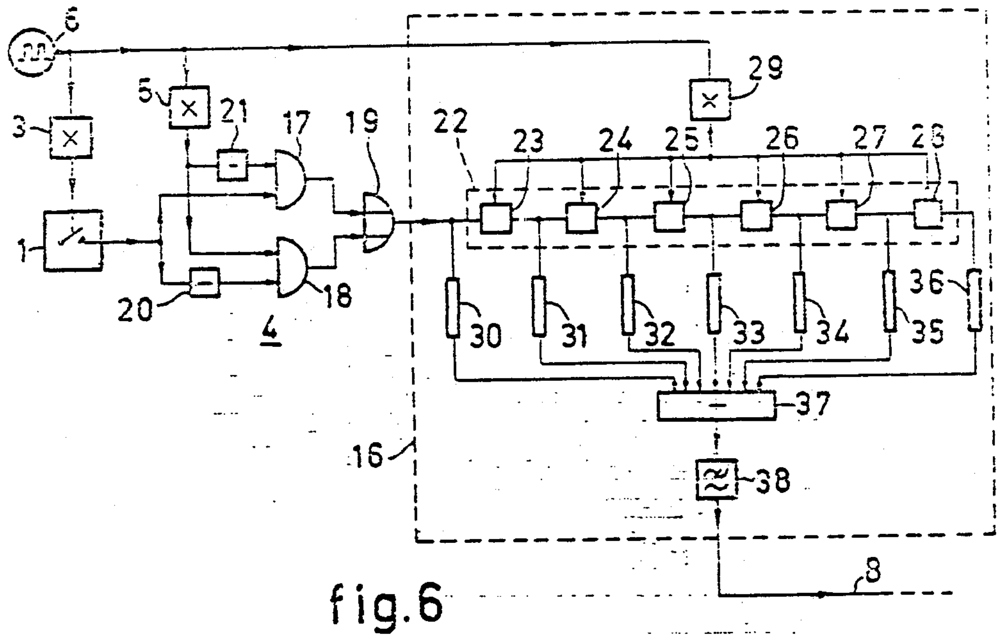
FIG. 6 shows a modification of the transmitter end of the device of FIG. 1.
Figure 2A:
Figure 2B:
Figure 2C:
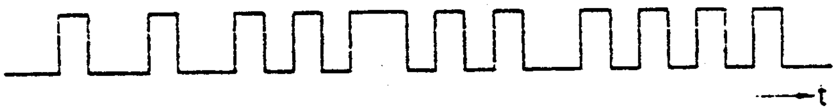
Figure 2D:
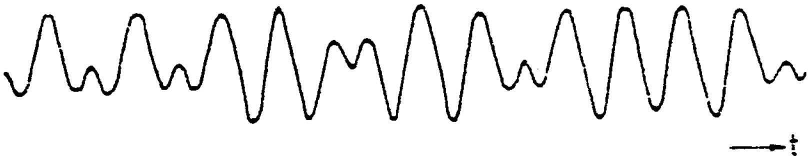
Figure 2E:
Figure 2F:
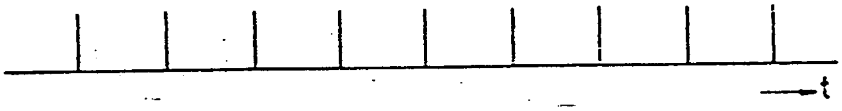
Figure 2G:
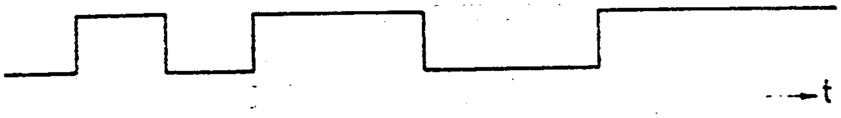
Figure 3A:
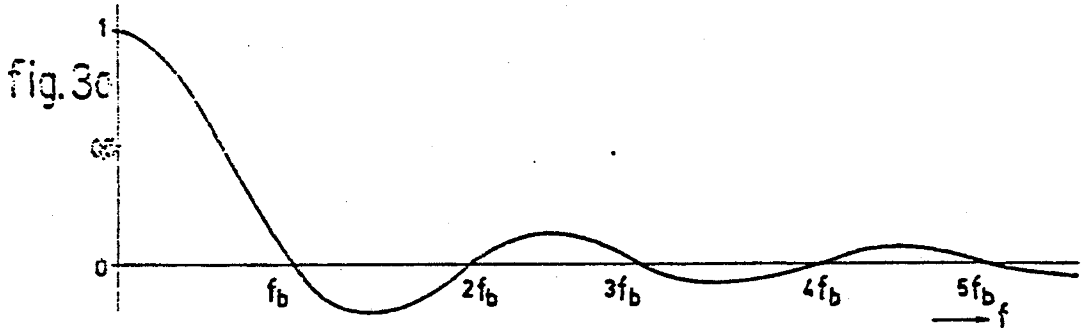
Figure 3B:
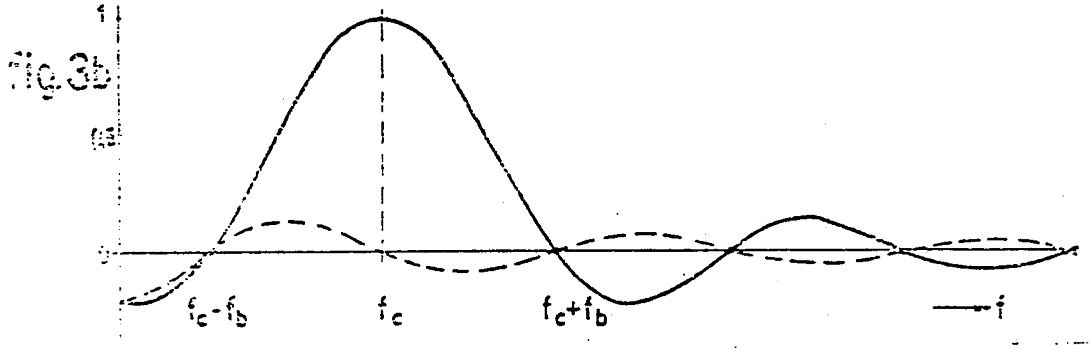
Figure 3C:
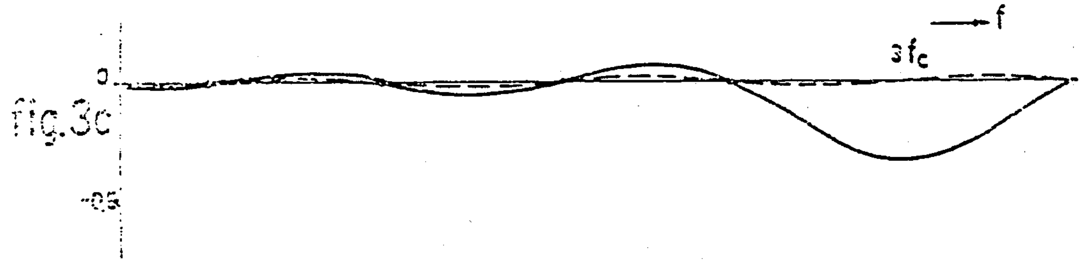
Figure 3D:
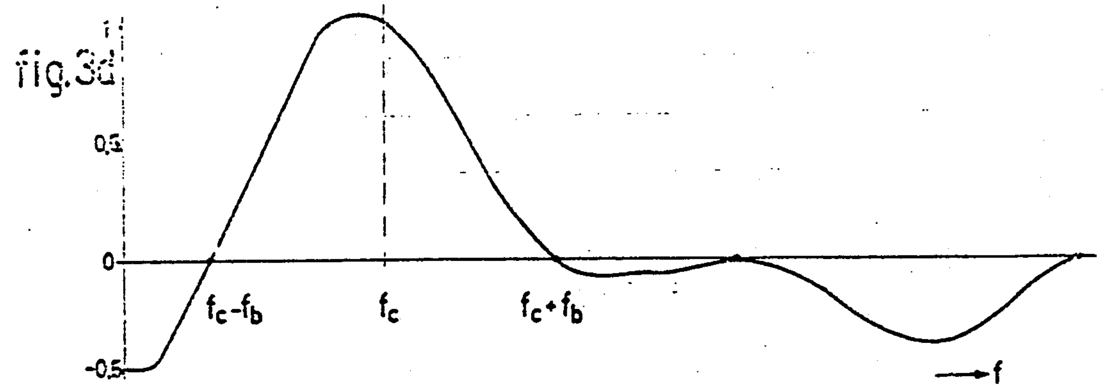

FIG. 6 shows a modification of the transmitter end of the transmission device of FIG. 1, in which elements corresponding to those in FIG. 1 have the same reference numerals in FIG. 6.

The switching modulating device 4 shown in greater detail is formed in FIG. 6 by two AND gates 17, 18 whose outputs are connected through an OR gate 19 to the linear network 16. The bivalent information pulses originating from information source 1 are applied to each of the AND gates 17, 18 through lines one of which is provided with an inverter 20, while the rectangular carrier oscillation originating from carrier oscillator 5 is likewise applied to each of the two AND gates 17, 18 through carrier lines one of which is provided with an inverter 21. Both in the presence and absence of an information pulse in the pulse series to be transmitted originating from information source 1 the carrier oscillation occurs at the output of OR gate 19, but in the absence of an information pulse the carrier oscillation of carrier oscillator 5 is directly passed on through AND gate 18 to OR gate 19, whereas in the presence of an information pulse this carrier oscillation from carrier oscillator 5 is passed on through AND gate 17 to OR gate 19 only after having undergone an inversion in an inverter 21, that is to say a phase shift $\pi$. Thus a phase shift occurs at transitions in the series of information pulses in the carrier oscillation applied to the linear network 16 so that this carrier oscillation is phase modulated by the series of information pulses.

Furthermore the linear network 16 is formed by a digital filter which includes a shift register 22 having a number of shift register elements 23, 24, 25, 26, 27, 28 whose contents are shifted at a shift period which is smaller than the minimum duration of pulse to be applied to the shift register 22 under the control of a shift pulse generator 29, while the shift frequency $f_s$ of the shift pulse generator 29 and the carrier frequency $f_c$ of the carrier oscillator 5 and the clock frequency $f_b$ of the clock pulse generator 3 are derived from the central pulse generator 6.

In the embodiment of FIG. 6 the shift pulse generator 29 is likewise formed by an astable multivibrator which is synchronized by the pulses having a repetition frequency $f_o$ from the central pulse generator 6 and which supplies shift pulses at a frequency $f_s$ which is an integer multiple of the carrier frequency $f_c$ and which is, for example, 7,200 c./s. so that the shift pulse frequency $f_s$ is derived from the frequency $f_o$ of the central pulse generator 6 by frequency multiplication by a factor of 24 in the astable multivibrator 29 functioning as a frequency multiplier. The shift register elements 23, 24, 25, 26, 27, 28 in the digital filter 16 are also connected through attenuation networks 30, 31, 32, 33, 34, 35, 36 to a combination device 37 from which the output signals of the transmission device are derived. In this embodiment the shift register 22 consists, for example, of a number of bistable triggers.

The desired transfer function $H(\omega) = C(\omega).F(\omega)$ is now achieved with the aid of the digital filter 16 by suitably proportioning at a given shift period $s = 1/f_s$ the respective transfer coefficients $C_{13}, C_{12}, C_{11}, C_0$, $C_1, C_2, C_3$ of the attenuation networks 30, 31, 32, 33, 34, 35, 36. The previously mentioned prior patent application mathematically shows that in case of 2N shift register elements and attenuation networks which are pairwise equal starting from the ends of the shift register 22 and in which their transfer coefficients $C_p$ satisfy: $C_{1p} = C_p$ with $p = 1, 2, \ldots N$, (14) a transfer function is obtained whose amplitude frequency characteristic $\Psi(\omega)$ has the form:

$$\Psi(\omega) = C_0 + \sum_{p=1}^{N} 2C_p \cos p\omega s \quad (15)$$

and the phase frequency characteristic $\Phi(\omega)$ shows an exact linear variation in accordance with: $\Phi(\omega) = -N\omega s$ (16) The amplitude frequency characteristic thus forms a Fourier series developes in cosine terms whose periodicity $\Omega$ is given by: $\Omega s = 2\pi$ (17) If a given amplitude frequency characteristic $\Psi_0(\omega)$ is to be achieved the coefficients $C_p$ in the Fourier series can be determined with the aid of the relation:

$$C_p = (1/\Omega) \cdot \left(\int_0^{\Omega}\right) \Psi_0(\omega) \cdot \cos p\omega s \cdot d\omega \quad (18)$$

The form of the amplitude frequency characteristic is fully determined thereby but the periodical behavior of the Fourier series has the result that the desired amplitude frequency characteristic is repeated at a periodicity $\Omega$ in the frequency spectrum thus resulting in additional pass regions of the digital filter 16. In practice, these additional pass regions are not disturbing since in case of a sufficiently high value of the periodicity $\Omega$ and hence at a sufficiently small value of the shift period $s$ the frequency distance between the desired and the next additional pass region is sufficiently large to be able to suppress the additional pass regions by means of a simple suppression filter 38 behind the output of the combination device 37 without noticeably influencing the amplitude frequency characteristic and the linear phase frequency characteristic in the desired pass region. The suppression filter 38 is, for example, formed by a low-pass filter consisting of a capacitor and a resistor.

An essential extension of the uses is obtained by deriving the inverted pulse signals from the shift register elements which in addition to the pulse signals occur at the bistable triggers when the shift register elements are formed as bistable triggers. As a result it becomes possible to obtain negative coefficients $C_p$ in the Fourier series. Furthermore, an amplitude frequency characteristic $\Psi(\omega)$ in the form of a Fourier series developed in sine terms can be obtained at a linear phase frequency characteristic. To this end the attenuation networks have again been made pairwise equal starting from the ends of the shift register 22, but the central attenuation network 33 has a transfer coefficient $C_0$ which is equal to zero, and the inverted pulse signal is applied to the attenuation networks succeeding this attenuation networks 33, so that in case of 2N shift register elements, the transfer coefficients satisfy: $C_{1p}=-C_p$ with $p=1, 2, \ldots, N$ (19) For the transfer function then applies:

$$\Psi(\omega)=\sum_{p=1}^{N} 2C_p \sin p\omega s \qquad (20)$$

$$\phi(\omega)=-N\omega s+\pi/2$$

The linear phase frequency characteristic $\Phi(\omega)$ in accordance with (20) has a phase shift $\pi/2$ relative to $\Phi(\omega)$ in accordance with (16). The coefficients $C_p$ in the Fourier series can now be determined from the relation:

$$C_p=(1/\Omega)\cdot\int_0^{\Omega}\Psi_0(\omega)\cdot\sin p\omega s\cdot d\omega \qquad (21)$$

By suitable choice of the transfer coefficients of the attenuation networks any arbitrary amplitude frequency characteristic can be obtained in this manner at a linear phase frequency characteristic.

Thus in the embodiment shown, for a purely real correction function $C(\omega)$ in accordance with (10) the Fourier series developed in cosine terms in accordance with (15) is used when obtaining the transfer function $H(\omega)=C(\omega)\cdot F(\omega)$ of the digital filter 16, for the function $\Psi_o(\omega)$ given by:

$$\Psi_0(\omega)=F(\omega)\cdot\frac{\omega/\omega_c}{1-\omega/\omega_c}\cdot\text{cotg}\,(\pi\omega/2\omega_c) \qquad (22)$$

while in case of a purely imaginary correction function $C(\omega)$ according to (11) there is required that the Fourier series developed in sine terms according to (20) is used for obtaining $H(\omega)$ for this function $\Psi_o(\omega)$ given in (22) in order to bring about the desired constant phase shift $\pi/2$ of the entire spectrum (compare $\Phi(\omega)$ according to (20) with $\Phi(\omega)$ according to (16).

In addition to transfer functions having linear phase frequency characteristics it is alternatively possible to obtain transfer functions with the digital filter 16 of which the phase frequency characteristic does not show a linear variation. For example, for a complex correction function $C_c(\omega)$ according to (13) which occurs at a phase shift $\Phi$ of the carrier oscillation, the two Fourier series (15) and (20) are used for obtaining the transfer function $H(\omega)=C(\omega)\cdot F(\omega)$ namely the cosine series (15) for the real part of H $(\omega)$ and the sine series (20 ) for the imaginary part H $(\omega)$, the transfer coefficient of each attenuation network being formed by the algebraic sum of the relevant transfer coefficient $C_p$ according to (18) and the relevant transfer coefficient $C_p$ according to (20). The transfer function thus realized of the digital filter 16 then has the form:

$$e^{-jN\omega s}\cdot H^{R\omega}_{0} \qquad (23)$$

wherein the factor $e^{-jN\omega s}$ is an ideal delay having a magnitude of Ns of the modulated signals applied to the digital filter 16 (compare (4)). A possibly required constant phase shift $\pi$ of the entire spectrum as a result of a factor (−1) in the relations for the correction function $C(\omega)$ can be obtained in a simple manner by bringing about an inversion at a suitable place in the transmission path between switching modulating device 4 and information user 2.

The correction functions $C(\omega)$ referred to hereinbefore are derived in case the rectangular carrier oscillation from information source 1 is phase modulated, but may also be utilized in case this carrier oscillation is amplitude modulated by the series of information pulses as will now be described with reference to FIGS. 7 and 8.

Figure 7:
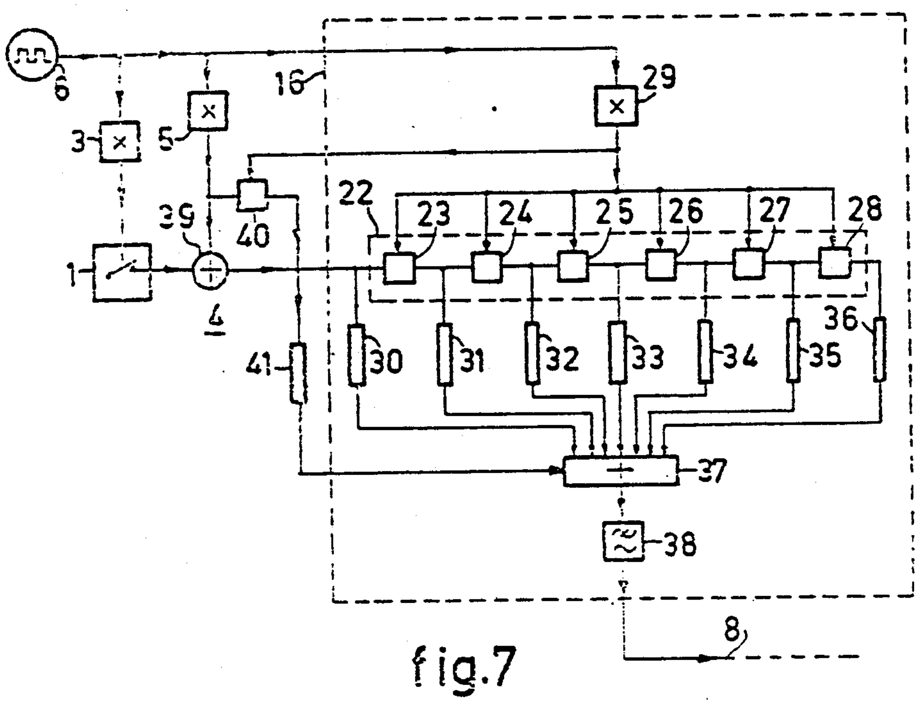

FIG. 7 shows a transmission device according to the invention, which is adapted for amplitude modulation and in which elements of FIG. 7 corresponding to those of FIG. 6 have the same reference numerals, while a few time diagrams are shown in FIG. 8 for explanation of the operation of the transmission device according to FIG. 7.

The switching modulating device 4 of FIG. 7 differs from that in FIG. 6 in that a modulo-2-adder 39 is utilized as a phase modulator in FIG. 7. When the series of information pulses *a* of FIG. 8 to be transmitted is applied to an input of modulo-2-adder 39 and the carrier oscillation shown at *b* in FIG. 8 is applied to the other input of this modulo-2-adder 39, then the phase-modulated carrier oscillation shown at *c* in FIG. 8 appears at the output of modulo-2-adder 39, which carrier oscillation, likewise as in the transmission device of FIG. 6, is applied to the digital filter 16 whose amplitude frequency characteristic has, for example, the shape shown at *c* in FIG. 4.

If the unmodulated rectangular carrier oscillation of carrier oscillator 5 is applied at a suitably chosen amplitude and phase, to the phase-modulated carrier oscillation *c* of FIG. 8, then the amplitude-modulated carrier oscillation shown at *d* in FIG. 8 appears. Since in case of modulation of the rectangular carrier oscillation with a random series of information pulses having a width of T the spectrum of the phase-modulated carrier oscillation shown at *c* in FIG. 8 and the spectrum of the amplitude-modulated carrier oscillation shown at *d* in FIG. 8 have the same envelope in the frequency band which is important for transmission, apart from the component of carrier frequency $\omega_c$, and the correction function $C(\omega)$ has also the same variation in both cases.

In the transmission device shown in FIG. 7 the unmodulated carrier oscillation is first applied in the combination device 37 of the digital filter 16, since in fact the shift register 22 can only handle bivalent pulses. To this end the rectangular carrier oscillation of carrier oscillator 5 is applied to the combination device 37 through a delaying network 40 for obtaining the correct phase and an attenuation network 41 for obtaining the correct amplitude while the suppression filter 38 prevents harmonics of the carrier frequency $\omega_c$ from getting as far as the transmission line 8. In the embodiment shown the delaying network 40 consists, for example, of a number of shift register elements whose contents are shifted at a shift period *s* also under the control of the shift pulse generator 29. In the embodiment shown the delaying network 40 together with a shift register 22 of 2N elements gives a delay which is equal to the ideal delay Ns of the digital filter 16 (compare (23) reduced by an odd number of times multiplied by half the carrier period D.

With given values of the shift period *s* and half the carrier period D the delay of the delaying network 40 can be rendered equal to zero by suitable choice of the number of shift register elements 2N in shift register 22, so that the delaying network 40 may then be omitted. With the previously mentioned values of the shift frequency $f_s$=7,200 c./s. and the carrier frequency $f_c$=1,800 c./s. this is, for example, the case for a number of shift register elements 2N equal to 20.

Figure 9:
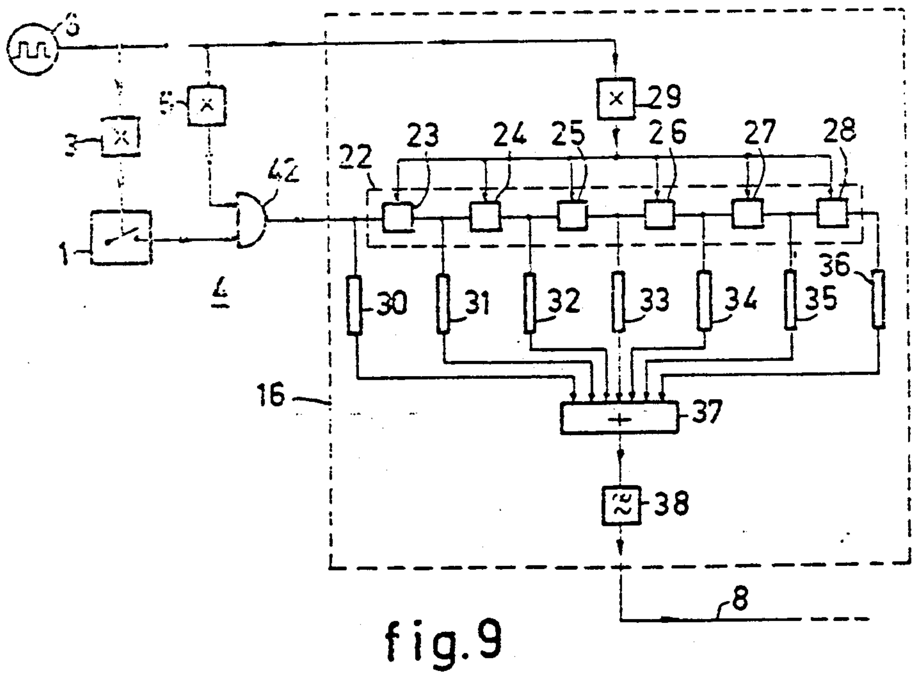

FIG. 9 shows a transmission device according to the invention which is also adapted for amplitude modulation but in which the switching modulating device 4 is now formed as an AND gate 42. For explanation of the operation of this transmission device FIG. 10 shows a few time diagrams and a frequency diagram.

Figures 10A, 10B, 10C:
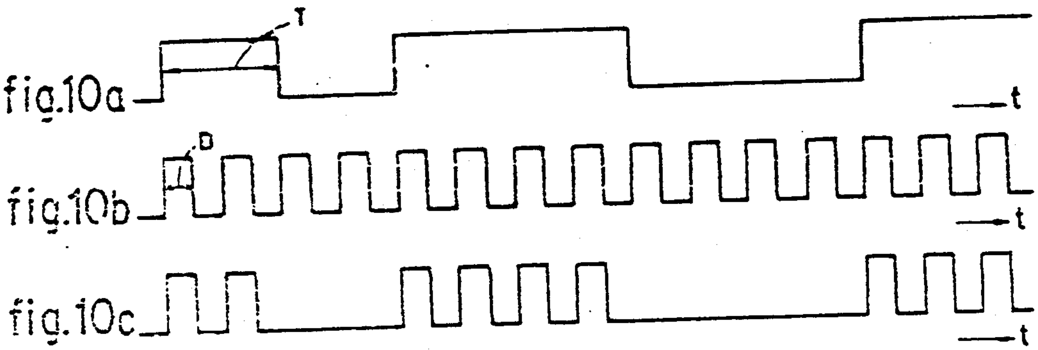
Figure 10D:
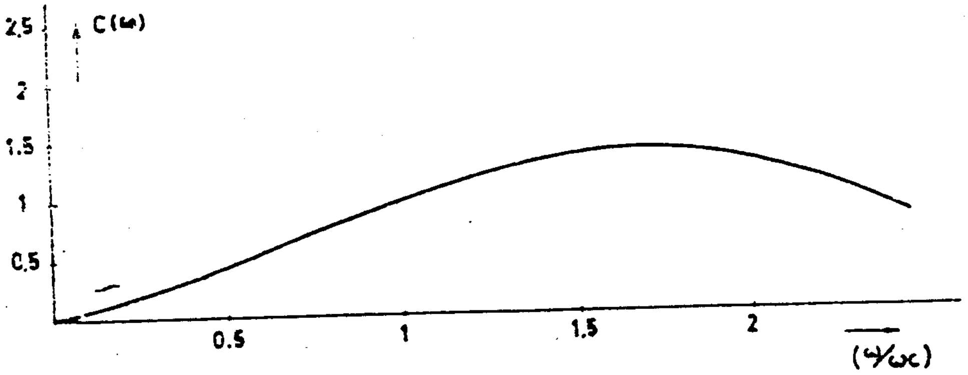

If, for example, a series of information pulses having a clock frequency $f_b$=1,200 c./s. and a shape shown at *a* in FIG. 10 is applied to an input of AND gate 42, and a series of square carrier pulses having a carrier frequency $f_c$=2,400 c./s. as shown at *b* in FIG. 10 is applied to the other input, then the amplitude-modulated carrier oscillation appears at the output of AND gate 42 as shown at *c* in FIG. 10.

As may be evident from a comparison of this amplitude-modulated carrier oscillation at *c* in FIG. 10 with that at *d* in FIG. 8, an unbalanced modulated carrier oscillation occurs when using the AND gate 42 as an amplitude modulator. As a result, in addition to the above given unwanted modulation products in the spectrum occurring at the output of the AND gate 42, spectrum components of the information pulses themselves occur within the frequency band which is important for transmission and which are to be taken into account when determining the correction function $C(\omega)$. The derivation of this correction function $C(\omega)$ can be effected in the manner extensively described in the foregoing with reference to FIG. 5. For the correction function $C(\omega)$, for example, the following relation is found for $\omega_c=k(\omega_b/2)$ if $k^3$ is an even number:

$$C(\omega)=(-1)^{(k+2)/2}\cdot\frac{\omega/\omega_c}{1-\omega/\omega_c}\cdot 2\cos(\pi\omega/2\omega_c) \qquad (24)$$

$$k=2, 4, 6, \ldots$$

Apart from a possible factor (−1) the variation of this transfer function $C(\omega)$ is at a normalized scale, hence at $C(\omega_c)$=1 shown at *d* in FIG. 10.

Also when transmitting the synchronous information pulses by means of frequency modulation in the form of frequency shift keying an optimum distinction can be obtained between the detected signals at the sampling instants by using the steps according to the invention, when both carrier frequencies *cl*, c1, $f_{c2}$ simultaneously satisfy the previously mentioned ratio between half the clock frequency $f_b/2$ and carrier frequency $f_c$ and additionally if the difference between the carrier frequencies $f_{c1}$, $f_{c2}$ is equal to the clock frequency $f_b$ or a multiple thereof. To this end the carrier frequency $f_{c1}$ is chosen to be equal to 1,200 c./s. and $f_{c2}$ is chosen to be equal to 2,400 c./s. in the transmission of the synchronous information pulses at a transmission speed of 1,200 Baud. In this embodiment the transmission device adapted for frequency shift keying is shown in FIG. 11, in which elements corresponding to those in FIG. 1 have the same reference numerals in FIG. 11.

Figure 11:
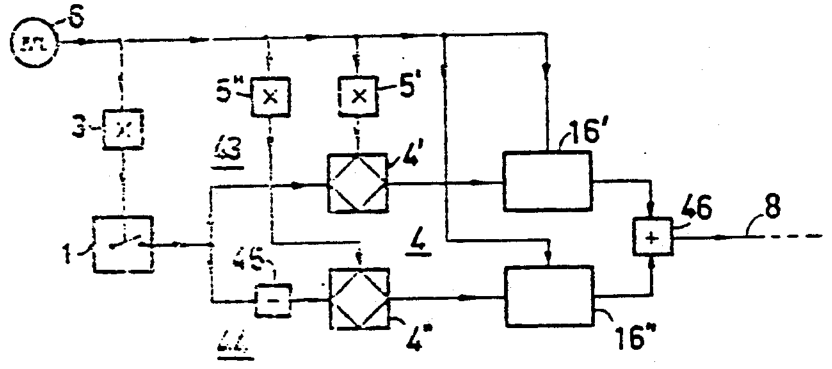

The switching modulating device 4 of FIG. 11 is formed by two parallel arranged channels 43, 44 which are each provided with switching modulator 4′, 4″ formed as amplitude modulators and fed by carrier oscillators 5′, 5″ and furthermore with linear networks 16′, 16″ succeeding these modulators, which networks, likewise as in the foregoing, are formed by a unit composed of output filter and correction circuit. The synchronous information pulses to be transmitted from information source 1 are applied to the inputs of the two channels 43, 44, the information pulses in channel 43 being applied directly to amplitude modulator 4′ and in channel 44 being applied through an inverter 45 to amplitude modulator 4″, while the outputs of the two channels 43, 44 are connected to a combination device 46 whose output is connected to the transmission line 8. Dependent on the presence or absence of an information pulse in the pulse series from information source 1 to be transmitted, either the carrier oscillation from carrier oscillator 5′ of, for example, the carrier frequency $f_{c1}$= 1,200 c./s. is applied through the linear network 16 to the combination device 46, or the carrier oscillation from carrier oscillator 5″ of the carrier frequency $f_{c2}$=2,400 c./s. is applied through the linear network 16″ to the combination device 46.

Thus the frequency shift keying modulator 4 is formed by two parallel arranged amplitude modulation channels 43, 44, which are alternately active under the control of the information pulses from information source 1. These channels 43, 44 may both be formed in accordance with the transmission device of FIG. 7, but also in accordance with the transmission device of FIG. 9. The correction function C′ (ω), C″ (ω) required in the linear networks 16′, 16″ depend on the chosen embodiment of the amplitude modulator 4′, 4″ and are given in the transmission device of FIG. 11 for an embodiment according to FIG. 7 by the relation (12) and for an embodiment according to FIG. 9 by the relation (24) wherein $\omega_c=\omega_{c1}$ must be taken for C′ (ω) and $\omega_c=\omega_{c2}$ must be taken for C″(ω). Furthermore the delays undergone by the modulated carrier oscillations in the linear networks 16′, 16″ must be mutually equal.

Figure 12:
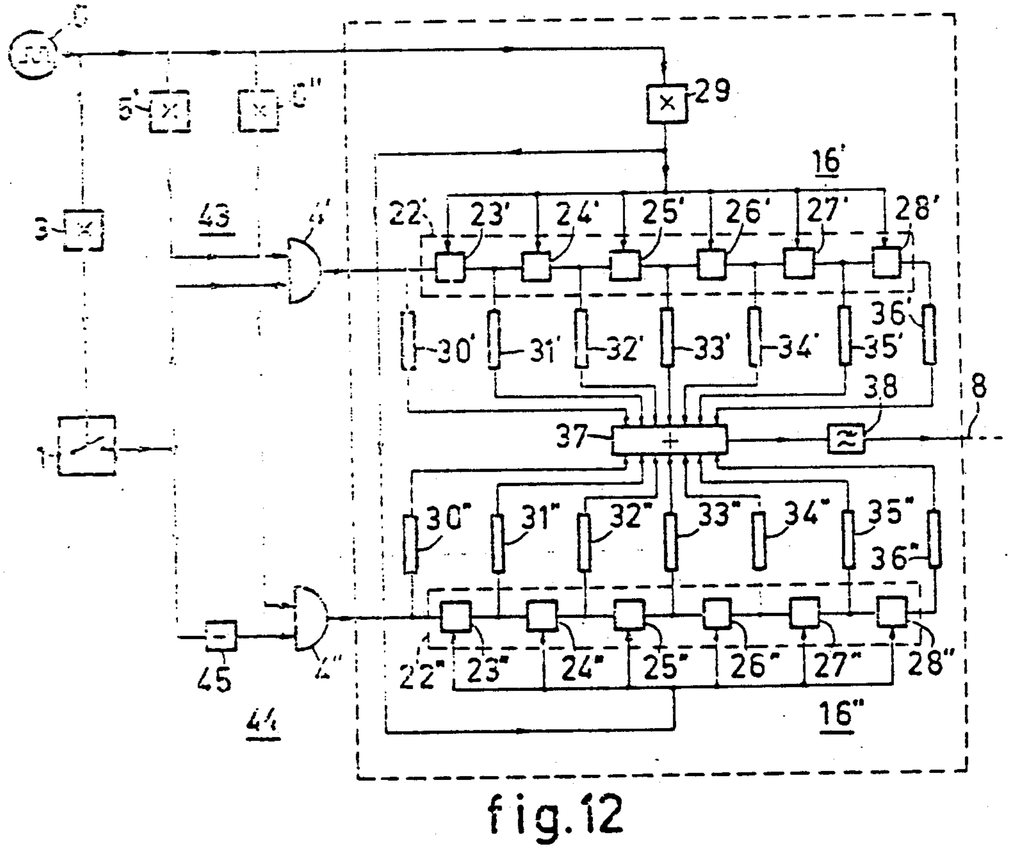
FIG. 12 shows a more detailed embodiment of the device of FIG. 11.

For illustration a more detailed embodiment of the transmission device of FIG. 11 is shown in FIG. 12 in which the amplitude modulation channels 43, 44 are formed according to FIG. 7 with AND gates as amplitude modulators 4′, 4″. FIG. 12 also shows a practical simplification which consists in that the linear networks 16′, 16″ formed as digital filters have a common shift pulse generator 29 and a common combination device 37 which also performs the function of the combination device 46 of FIG. 11.

The embodiment shown in which the two carrier frequencies $f_{c1}$, $f_{c2}$ simultaneously satisfy the relation $f_c=k(f_b/2)$ wherein *k* is an integer and in which it also applies that: $f_{c2}-f_{c1}=f_b$ allows of a still further simplification since on these conditions only one common linear network 16 may suffice for the two amplitude modulation channels 43, 44 as is indicated in the modification shown in FIG. 13 of the transmission device of FIG. 12.

In the embodiment of FIG. 13 the amplitude-modulated carrier oscillations at the output of the amplitude modulators 4′4″ are directly combined through an OR gate 47 and subsequent applied to a digital filter 16 which is common for the two amplitude modulation channels 43, 44.

Figure 14:
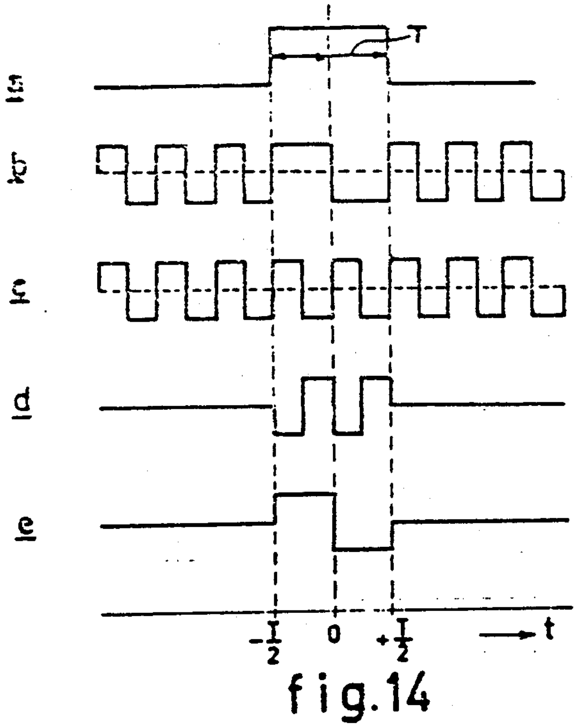

With reference to the time diagrams of FIG. 14 it will now be described that under the given conditions and at the frequency shift keying used, the required correction of the spectrum can indeed be carried out with only one common linear network 16. To this end the spectrum is considered which is brought about on supply of an isolated information pulse having a width of $T$x$1/f_b$ to the switching modulating device 4 in FIG. 13. Such an information pulse shown at *a* in FIG. 14 results in a frequency-modulated carrier oscillation of the shape shown at *b* in FIG. 14. As may be evident from FIG. 14 this modulated carrier oscillation *b* is to be considered as the sum of an unmodulated carrier oscillation *c* of the frequency $f_{c2}$, a carrier oscillation *d* modulated by the information pulse *a* likewise having a frequency $f_{c2}$, but having a phase which is opposite to *c*, and a carrier oscillation *e* of the frequency $f_{c1}$ modulated by the information pulse *a*. In the frequency band which is important for transmission the unmodulated carrier oscillation *c* results in a spectral line at $\omega=\omega_{c2}$ while the amplitude-modulated carrier oscillation *d* gives a spectrum $M_2(\omega)$ about $\omega=\omega_{c2}$ and the amplitude-modulated carrier oscillation *e* gives a spectrum M (ω) about $\omega=\omega_{c1}$. It can now be shown that under the given conditions a specific frequency component in the spectrum M(ω) is exactly in phase or in opposite phase with the component of the same frequency in the spectrum $M_2(\omega)$ so that the spectrum M(ω) of the frequency-modulated carrier oscillation *b* exactly forms the algebraic sum of the spectra $M_1(\omega)$ and $M_2(\omega)$. A similar consideration applies for the spectrum G(ω) desired at the output of the switching modulating device 4, while the required correction function $C(\omega)$, likewise as in the foregoing, is given by the quotient of $G(\omega)$ and M(ω). Thus, for example, for the embodiment shown, wherein $\omega_{c1}=k_1(\omega_b/2)$ with *k*x2 and $\omega_{c2}=k_2(\omega_b/2)$ with $k_2$=4, the correction function $C(\omega)$ is given by the relation:

$$C(\omega)=j\omega\cdot\frac{1/(\omega-\omega_{c1})+1/(\omega-\omega_{c2})}{tg\,(\pi\omega/2\omega_{c1})-tg\,(\pi\omega/2\omega_{c2})} \qquad (25)$$

The device according to the invention is described in the foregoing with reference to different manners of modulation in which it has been found that the variation of the required correction function $C(\omega)$ is entirely independent of the type of output filter, while in addition the remarkable advantage occurs, that this correction function $C(\omega)$ can be obtained in a simple manner with the aid of a digital filter so that a completely digital structure and hence a construction as in integrated circuit of the transmission device is possible.

In addition to the mentioned particularly advantageous properties it is found that the invention leads to a new structure of transmission devices for different applications as will now be described with reference to FIG. 15.

The transmission on device of FIG. 15 is adapted for the transmission of synchronous information pulses at a transmission speed of 2,400 Baud by means of differential four-phase modulation of a rectangular carrier oscillation having a carrier frequency $f_c$=1,800 c./s. To this end the series of information pulses from information source 1 is applied at a transmission speed of 2,400 Baud to a converter 48 which on the one hand splits up the applied series of information pulses in two simultaneously occurring series of information pulses at half the transmission speed of 1,200 Baud each and on the other hand brings about the coding required for differential four-phase modulation of these two series of information pulses at half the transmission speed. The series of information pulses at the output of the converter 48 are simultaneously applied to phase modulators 49, 50 in the form of modulato-2-adders, the rectangular carrier oscillation from carrier oscillation 5 of carrier frequency $f_c$=1,800 c./s. being directly applied to phase modulator 49 and to phase modulator 50 through a delaying network 51 having a delay $D/2=1/(4f_c)$, hence corresponding to a phase shift $\pi/2$ for the carrier frequency $f_c$. The phase-modulated orthogonal carrier oscillations at the output of the phase modulators 49, 50 are combined after filtering and spectrum correction in the digital filter 16′, 16″ to a four-phase modulated carrier oscillation in the combination device 37.

In the embodiment shown of the converter 48 the series of information pulses of clock frequency $f_b$=2,400 c./s. is applied to a diode matrix 52, namely on the one hand directly, pulse series A, and on the other hand through a delaying network 53 having a delay of $T=1/f_b$, pulse series B. The clock frequency $f_b$=2,400 c./s. is obtained in this case by frequency multiplying the clock pulses of frequency $f_b/2$=1,200 c./s. from clock pulse generator 3 by factor of 2 in a frequency doubler 3′. The series of information pulses at the output of converter 48, pulse series X and Y, are also applied to the diode matrix 52. The series of information pulses formed by pulses having a width of T at the output of diode matrix 52, pulse series C and D, are applied to AND gates 54, 55 to which also the series of clock pulses from clock pulse generator 3 of half the clock pulse frequency $f_b/2$ is applied. Bistable triggers 56, 57 are connected to the output of the AND gate 54, 55 for the formation of the pulse series X and Y of pulses having a width of 2T. To ensure that the four possible pairs of successive information pulses ("dibits") in the series originating from information source 1, hence the four possible combinations of simultaneously occurring information pulses in the pulse series A and B, cause phase shifts $\Delta\Phi$ of the carrier oscillation at the output of the transmission device which shifts are an integer multiplied by $\pi/2$ for the carrier frequency $f_c$, the relationship given in the table of FIG. 16 should exist between the combination of the pulse series A and B at the input of the diode matrix 52 and the combination of the pulse series X and Y at the output of converter 48.

The table of FIG. 16 shows how in case of a given combination $X_n$, $Y_n$ and supply of a combination A, B the future combination must be $X_{n+1}$, $Y_{n+1}$ in order to bring about the phase shift $\Delta\Phi$ associated with this combination A, B. As is known such a relationship can be brought about with the aid of a diode matrix. The vector diagram of FIG. 16 shows the four possible phases of the carrier oscillation of frequency $f_c$ at the output of the transmission device together with the associated combination X, Y. It is found, for example, from the vector diagram that the supply of a combination A, B=10, which involves a phase shift $\Delta\Phi=3\ \pi/2$, at a given combination $X_n$, $Y_n$=10 must result in the future combination $X_{n+1}$, $Y_{n+1}$=00 in conformity with the table.

The correction functions $C'(\omega)$ and $C''(\omega)$ required in the digital filters 16′ and 16″ then follow from the relation (12) and the relation (13) respectively, for $k$=3, in which for $C''(\omega)$ the factor $j$, hence the phase shift $\pi/2$ of the entire spectrum is, however, not obtained, since otherwise the orthogonal relation of the phase-modulated carrier oscillation for combination in the combination device 37 is eliminated. Furthermore, the filter function $F(\omega)$ in the embodiment shown is chosen to be such that when using differential demodulation at the receiver end practically no mutual influence of recovered information pulses ("intersymbol interference") occurs for each of the two orthogonal phase-modulated carrier oscillations to which end in this case the envelope of each of the two orthogonal spectra at the output of the transmission device has the shape shown at $a$ in FIG. 17 ("raised-cosine spectrum"). In the manner as already extensively described hereinbefore, it then follows that the transfer function $H'(\omega)=C(\omega)\cdot F(\omega)$ of the digital filter 16′ and the transfer function $H''(\omega)=C''(\omega)\cdot F(\omega)$ of the digital filter 16″ are given by the following relations:

$$H'(\omega)=(\omega/\omega_c)\cdot\text{cotg}(\pi\omega/2\omega_c)\cdot[\sec(2\pi\omega/\omega_b)-\text{tg}(2\pi\omega/\omega_b) \qquad (26)$$

$$H''(\omega)=\text{cotg}(\pi\omega/4\omega_c)\cdot H'(\omega)$$

sec secant cotg cotangent wherein $\omega_c-\omega_b/2\ \omega\ \omega_c+\omega_b/2$. The variation of $H'(\omega)$ and $H''(\omega)$ is shown, apart from a factor (−2), ~~on a normalized~~ scale thus with $H'(\omega_c)=H''(\omega_c)=1$, for the region $\omega_c-\omega_b/2\ \omega\ \omega_c+\omega_b/2$ at $b$ and $c$, respectively, in FIG. 17.

The transmission device shown in FIG. 15 can also be utilized to obtain orthogonal modulation in an entire digital manner to which end the converter 48 is changed in such a manner, while omitting the diode matrix 52, that the pulse series A and B are directly applied to the AND gates 54, 55.

What is claimed is:

1. A system for supplying rectangular synchronous information pulses from an information source to an information consumer within a prescribed frequency band wherein the information pulses coincide with different pulses from a series of equidistant clock pulses from a clock pulse generator, comprising a central generator for generating a fixed signal, means to derive ~~clock pulses~~ from the central generator, means to derive a rectangular carrier oscillator signal which is a integral number ~~less than 10~~ multiplied by half the clock pulse generator frequency, a source for rectangular synchronous information pulses derived from the clock pulse generator frequency output, a switching modulation device for the direct modulation of the rectangular synchronous information pulses on the rectangular carrier oscillator signal, a band-pass filter having a band-pass corresponding to the prescribed frequency and a correction circuit for minimizing the unwanted modulation products generated in the switching modulation device, wherein the band-pass filter and the correction circuit are interconnected and are coupled between the switching modulation device and the output of the system.

2. A system as claimed in claim 1, wherein the output filter and the correction circuit are combined to form one linear network which is formed by a digital filter comprising a shift register having a number of shift register elements whose contents are shifted at a shift period smaller than the minimum duration of a pulse to be applied to the shift register under the control of a shift pulse generator, the shift frequency of the shift pulse generator being derived from the central generator from which the clock frequency of the clock pulse generator and the carrier frequency of the carrier oscillator are derived.

3. A system as claimed in claim 2, wherein the ends of the shift register elements are connected through attenuation networks to a combination device which is connected to the transmission path.

4. A system as claimed in claim 3, wherein the attenuation networks have been made pairwise equal starting from the ends of the shift register.

5. A system as claimed in claim 1 wherein means for obtaining a simple transfer function of the correction circuit comprises means to adjust the phase relationship between the rectangular synchronous information pulses and the rectangular carrier oscillator signal so that the leading and lagging edges of the rectangular synchronous information pulse substantially coincide with the leading and lagging edges of the rectangular carrier oscillator signal.

6. A system as claimed in claim 1 wherein means for obtaining a simple transfer function of the correction circuit comprises means to adjust the phase relationship between the rectangular synchronous information pulses and the rectangular carrier oscillator signal so that the leading and lagging edges of the rectangular synchronous information pulses substantially coincide with diameters of directly successive leading and lagging edges of the rectangular carrier oscillator signal.

7. A system as claimed in claim 1 wherein the switching modulating is formed as a digital phase modulator and that the transfer function $C(\omega)$ of the correction circuit as a function of the radial frequency $\omega$ for information pulses having a width of $T=2\pi/\omega_b$ is adjusted in accordance with the relation:

$$C(\omega) = (-j)^{k-1} \cdot \frac{\omega/\omega_c}{1-\omega/\omega_c} \cdot \mathrm{cotg}\,(\pi\omega/2\omega_c)$$

with $$\omega_c = k(\omega_b/2) \text{ and}$$
$$k = 1, 2, 3, \ldots$$

wherein $\omega_b$ represents the clock radial frequency $\omega_c$ represents the carrier radial frequency.

8. A system as claimed in claim 1 wherein the switching modulating device is adapted for amplitude modulation and is formed as a digital phase modulator while using a correction circuit associated with this phase modulator, the phase-modulated carrier oscillation obtained in this phase modulator being applied to a combination device to which also the carrier oscillation of the carrier oscillator is applied.

9. A system as claimed in claim 8 wherein the switching modulating device constructed as a digital frequency shift-keying modulator is formed by two parallel arranged channels which are each provided with an amplitude modulator fed by a carrier oscillator having a carrier frequency derived from the central generator, the information source for one channel being directly connected to the relevant amplitude modulator and for the other channel being connected to the relevant amplitude modulator through an inverter, while furthermore each channel includes a correction circuit associated with the amplitude modulator, the output of each channel being connected to a combination device whose output is connected to the transmission.

10. A system as claimed in claim 1 wherein the switching modulating device constructed as an amplitude modulator is formed by an AND-gate and that the transfer function $C(\omega)$ of the correction circuit as a function of the radial frequency $\omega$ for information pulses having a width of $T=2\pi/\omega_b$ is adjusted in accordance with the relation:

$$C(\omega) = (-1)^{(k+2)/2} \cdot \frac{\omega/\omega_r}{1-\omega/\omega_r} \cdot 2\cos\,(\pi\omega/2\omega_r)$$

with $$\omega_r = k(\omega_b/2) \text{ and}$$
$$k = 2, 4, 6, \ldots$$

wherein $\omega_b$ represents the clock radial frequency and $\omega_r$ represents the carrier radial frequency.

11. A system as claimed in claim 1 the switching modulating device constructed as a digital frequency shift-keying modulator is formed by two parallel-arranged channels each being provided with an amplitude modulator fed by a carrier oscillator having a carrier frequency derived from the central generator, the difference between the carrier frequencies being equal to an integer multiplied by the clock frequency, the information source for one channel in said switching modulating device being directly connected to the relevant amplitude modulator and for the other channel being connected to the relevant amplitude modulator through an inverter, the outputs of the two amplitude modulators being connected to a combination device which is connected to a correction circuit which is common for the two channels.

12. A system as claimed in claim 1 wherein the switching modulating device is adapted for modulation of two orthogonal rectangular carrier oscillations of the same carrier frequency, which switching modulating device is formed by two switching modulators fed by orthogonal carrier oscillations from the common carrier oscillator, the series of information pulses from the information source being applied to a converter for splitting up in two simultaneously occurring series of information pulses whose pulses coincide with a series of clock pulses of half the clock frequency, and each of the two last-mentioned series of information pulses at the output of the converter is applied to one of the switching modulators, while each of these switching modulators is succeeded by a correction circuit associated with this switching modulator, the two correction circuits being connected to a combination device whose output is connected to the transmission path.